United States Patent
Bourget et al.

(10) Patent No.: US 6,658,184 B2
(45) Date of Patent: Dec. 2, 2003

(54) PROTECTIVE SKIN FOR OPTICAL FIBERS

(75) Inventors: Vincent Bourget, Boulogne sur Mer (FR); Nelly Drabczyk, Calais (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/864,270

(22) Filed: May 25, 2001

(65) Prior Publication Data

US 2002/0001440 A1 Jan. 3, 2002

(30) Foreign Application Priority Data

May 29, 2000 (FR) .............................. 00 06838

(51) Int. Cl.[7] ................................. G02B 6/44
(52) U.S. Cl. ..................................... 385/100
(58) Field of Search ................. 385/128, 100

(56) References Cited

U.S. PATENT DOCUMENTS

| | | | | |
|---|---|---|---|---|
| 4,396,746 A | * | 8/1983 | Toga ......................... 525/437 |
| 4,679,898 A | * | 7/1987 | Grooten .................. 174/105 R |
| 4,801,186 A | * | 1/1989 | Wagatsuma et al. ........ 385/128 |
| 4,806,588 A | * | 2/1989 | Fujimoto et al. ........... 524/505 |
| 4,894,427 A | * | 1/1990 | Yamamoto et al. ......... 528/26 |
| 5,091,478 A | * | 2/1992 | Saltman ..................... 525/179 |
| 5,405,909 A | * | 4/1995 | Ohmae et al. ............. 525/92 B |
| 5,889,114 A | * | 3/1999 | Statz ......................... 525/166 |
| 5,928,767 A | * | 7/1999 | Gebhardt et al. ........... 174/258 |
| 5,985,961 A | * | 11/1999 | Dailey et al. ............... 428/480 |
| 6,180,251 B1 | * | 1/2001 | Kanai et al. ................ 428/457 |
| 2002/0034367 A1 | * | 3/2002 | Gaillard et al. ............. 385/113 |

FOREIGN PATENT DOCUMENTS

| | | |
|---|---|---|
| EP | 0 163 427 A1 | 12/1985 |
| EP | 0 295 336 A2 | 12/1988 |
| EP | 0760 108 | 3/1997 |
| EP | 1 024 382 A2 | 8/2000 |

OTHER PUBLICATIONS

John Leahman's Operational Organic Chemistry: A Problem Solving Approach to the Laboratory Course, 3rd ed.*

* cited by examiner

*Primary Examiner*—Edward J. Glick
*Assistant Examiner*—Krystyna Suchecki
(74) *Attorney, Agent, or Firm*—Sughrue Mion, PLLC

(57) ABSTRACT

The invention relates to a telecommunications cable module comprising at least one optical fiber surrounded by a protective skin of a thermoplastic elastomer having flexible diol segments, and in particular a polyester thermoplastic elastomer. In the invention, the thermoplastic elastomer having flexible diol segments presents a melting point greater than 130° C. and an initial resistance to tearing less than 60 kN/m. The material proposed by the invention is easily applied to fibers, in particular by extrusion.

20 Claims, 1 Drawing Sheet

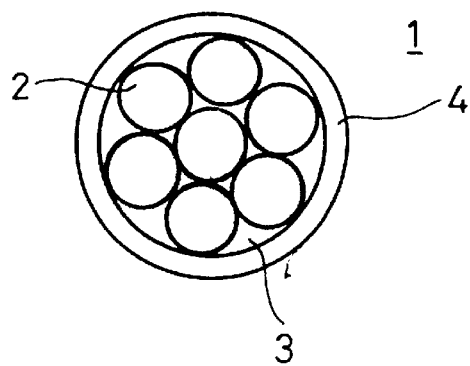
FIG_1
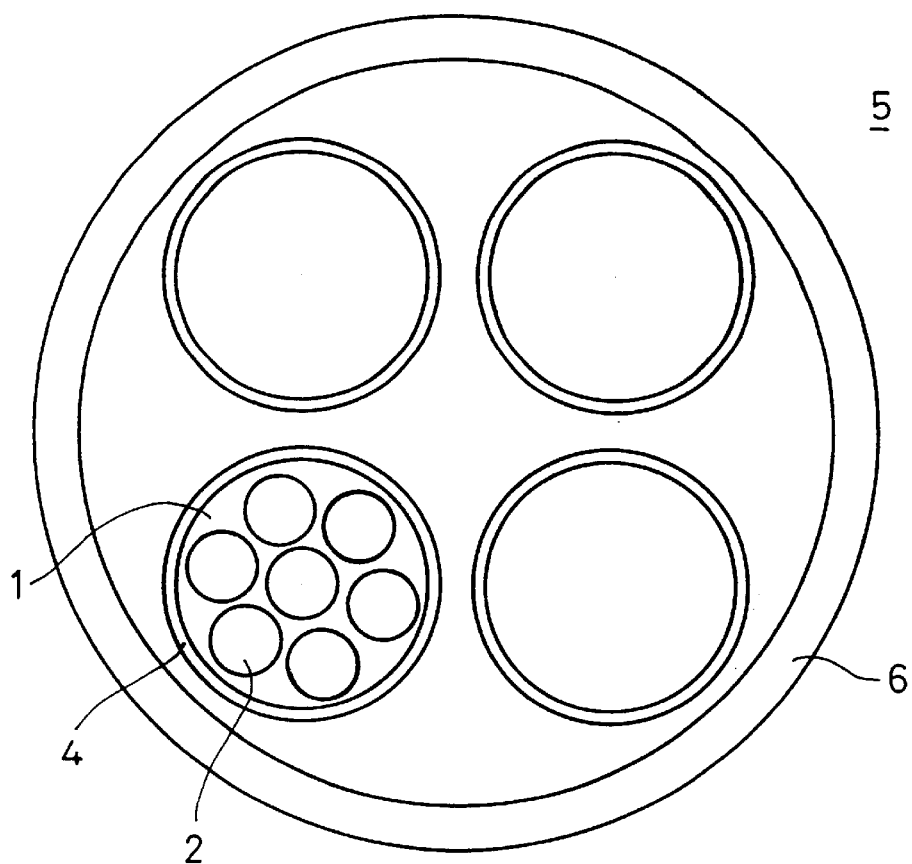
FIG_2

PROTECTIVE SKIN FOR OPTICAL FIBERS

The present invention relates to telecommunications cables. It relates more particularly to cables containing optical fibers disposed in a tube made of a thermoplastic elastomer having flexible diol segments, and in particular a thermoplastic polyester elastomer.

BACKGROUND OF THE INVENTION

An optical fiber cable is generally constituted by an outer sheath and metal or dielectric protective reinforcing elements together surrounding a plurality of modules, each comprising a plurality of fibers surrounded by a protective tube. The purpose of these tubes is to protect the fibers both mechanically and chemically, and they are also used for identifying the modules. For example, a 144-fiber cable comprises 12 tubes each containing 12 fibers, the tubes being assembled around a central carrier, and the entire assembly being surrounded by a sheath of polyethylene. The fibers are individually colored within each tube, and the tubes are themselves colored.

It is known to place optical fibers in tubes that are rigid and thick-walled, and that do not come directly into contact with the fiber. EP-A-0 769 711 describes such tubes. WO-A-96/23239 or EP-A-0 968 809 are other examples of thick rigid tubes of filled polyethylene/polypropylene copolymer or of a thermoplastic matrix containing stiffening elements. Nevertheless, those tubes suffer in particular from the drawback of not enabling the fibers to be accessed with the fingers unless special tools are used, and of not being very flexible.

To protect the optical fiber in a telecommunications cable, flexible tubes are also known that are extruded directly onto the fiber. This type of tube is then referred to as a "skin".

A solution of that type is described in the Applicant's European patent application 00 400 187.1 of Jan. 25, 2000 (published under the No. EP-A-1 024 382). That document states that it is known to use plasticized polyvinylchloride (PVC) for the skin, and some polyolefins; as a flexible covering for an optical fiber, that document proposes using a polyolefin-based thermoplastic elastomer material having a modulus of elasticity of about 500 megapascals (MPa) at ambient temperature, and a modulus of elasticity of about 1500 MPa at −40° C. An example is ethylene propylene (EPR) copolymer. As also stated in that document, such a skin must have properties of elasticity, while nevertheless being capable of being torn in order to give access to the fiber it protects. A new problem that the invention sets out to solve is that of sticking during sheath manufacture.

The outer sheath is generally made by extruding polyethylene around modules assembled at molten polymer temperatures that can locally be as high as 150° C. or 160° C. Unfortunately, at a temperature above the melting point of the polymers used, the modules run the risk of sticking together, and that can reduce protection, while also making it more difficult or even impossible to access the fibers and to identify them.

OBJECTS AND SUMMARY OF THE INVENTION

The invention seeks to propose a protective skin for optical fibers that are brought together in modules to form cables, and that give access to fibers without using tools while also withstanding temperatures of at least 130° C.

The invention solves these problems by means of a protective skin made of a thermoplastic elastomer having flexible diol segments.

The invention also provides a method of manufacturing such optical fiber modules. Finally, the invention provides an optical fiber cable containing such modules.

More precisely, the invention provides a telecommunications cable module comprising at least one optical fiber surrounded by a protective skin of thermoplastic elastomer having flexible diol segments, with a melting point greater than 130° C. and initial resistance to tearing of less than 120 kilonewtons per meter (kN/m). In an embodiment, the thermoplastic elastomer is a TEEE, and of these, preferably, a polybutylene terephthalate glycol block copolymer.

In an aspect of the invention, the thermoplastic elastomer may include a filler which can be selected from: carbon black, silica, kaolin, alumina, clay, talc, chalk, magnesia, and titanium dioxide.

In another aspect of the invention, the thermoplastic elastomer includes a fire-retarding agent.

In an embodiment, the thermoplastic elastomer possesses hardness on the Shore D scale of less than 50. In another embodiment, the melting point of the skin material is at least 140° C. In yet another embodiment, the initial resistance to tearing of the skin material is less than 60 kN/m. In yet another embodiment, the breaking elongation of the skin material lies in the range 50% to 300%. In yet another embodiment, the ultimate tensile strength of the skin material lies in the range 5 MPa to 15 MPa. Finally, in another embodiment, the hot fluidity index to the skin material is greater than or equal to 2 grams per ten minutes (g/10 min).

The invention also provides a method of manufacturing a telecommunications cable module of the invention, the method comprising the step of applying a protective skin of thermoplastic elastomer having flexible diol segments onto said at least one optical fiber. In an implementation, the protective skin is applied by extrusion.

Finally, the invention also provides a telecommunications cable including at least one module of the invention.

BRIEF DESCRIPTION OF THE DRAWING

Other characteristics and advantages of the invention will appear on reading the following description of embodiments of the invention given purely by way of example, and with reference to the accompanying drawing, in which:

FIG. 1 is a diagrammatic section view through an optical fiber module of the invention; and FIG. 2 is a diagrammatic section view through a telecommunications cable including optical fiber modules of the invention.

MORE DETAILED DESCRIPTION

FIG. 1 is a section view of a telecommunications cable module 1 comprising at least one and generally a plurality of optical fibers 2. The optical fibers 2 are surrounded by a flexible tube 4 referred to as a "skin". The gaps between the fibers are general occupied by a hydrophobic gel 3, e.g. based on silicones.

It is also possible to use a powder that swells, or to leave nothing between the fibers. The skin 4 is applied to the set of optical fibers, e.g. by extrusion. The thickness of the skin 4 is preferably small, e.g. lying in the range 0.05 millimeters (mm) to 0.25 mm, and is preferably 0.15 mm. Small thickness is desirable insofar as it facilities access to the fiber and makes it possible to reduce the overall weight of the cable. The lower limit of thickness is given by the protection which the skin gives to the fiber, and by the constraints involved in manufacturing the skin.

FIG. 2 is a diagram of a telecommunications cable 5 having a plurality of optical fiber modules 1. The modules 1 are assembled together and surrounded by optional protection, reinforcement being optionally included in an outer sheath 6. In the example shown in the figure, any reinforcement or protection is omitted.

In the invention, the term "thermoplastic elastomer having flexible diol segments" is used to mean a copolymer including segments which can be polyether or polymer diol blocks.

For example, the thermoplastic elastomer having flexible diol segments is selected from the following:

(i) polyetherester, e.g. comprising polyether sequences having hydroxyl ends bonded to polyester sequences having acid ends, the structure possibly also including diols (e.g. 1,4 butanediol);

(ii) polyurethaneether, e.g. comprising polyether sequences having hydroxyl ends bonded to diisocyanates by urethane functions;

(iii) polyurethaneester, e.g. comprising polyether sequences having hydroxyl ends bonded to diisocyanates by urethane functions;

(iv) polyuretaneetherester, e.g. comprising polyester sequences and polyether sequences having hydroxyl ends, said sequences being bonded to diisocyanate residues by urethane functions. It is also possible to have polyetherpolyester chains with hydroxyl ends bonded to diisocyanates by urethane functions; and (v) polyetheramides, polyethers with polyamide sequences, e.g. obtained by reacting polyamide sequences having diamine chain ends with polyoxyalkylene sequences having dicarboxylic chain ends, or polyamide sequences having dicarboxylic chain ends with polyoxyalkylene sequences having diamine chain ends, or polyamide sequences having dicarboxylic chain ends with polyether diols, the polyetheramides that are obtained then being polyetherester amines.

In the description below, these chains (polyether, polyester, or polyetherpolyester) having hydroxyl ends are referred to by the term "polymer diol".

These polymers can be present on their own or in a mixture.

Polyetheresters are thermoplastic elastomer copolymers. They are linear polymers made up firstly of polyester sequences, produced by reacting dicarboxylic derivatives (terephthalate, isophthalate, etc.) with diols (ethyleneglycol, 1,4-butanediol, cyclohexanedimethanol, etc.) and also polyether sequences (polytetramethylene-etherglycol, polyoxypropyleneglycol, polyethyleneglycol) (flexible segments).

The elastomer properties are provided by flexible segments in the polymer chain (copolymers with polyether segments). Low-mass diols lead to hard segments in the linear copolyester chain. The elastomer properties of the final product depend on the hard segment to flexible segment ratio and on the stage of crystallization. Hard segments contribute to the strength and the stiffness of the final copolymer while flexible segments provide flexibility. These copolymers are generally prepared in two stages:

transesterification; and polycondensation.

An example of a commercial product is the Hytrel® polymer sold by Dupont. It comprises block copolymers constituted by hard (crystalline) segments of polybutylene terephthalate, and soft (amorphous) segments of long glycol chains. The properties of this material depend on the value of the ratio between the hard segments and the soft segments, and on the way they are arranged. The international acronym for such thermoplastic elastomers is TEEE (thermoplastic ether-ester elastomer).

Thermoplastic polyurethane (TPU) elastomers are copolymers based on polyurethane that can be obtained by combined reaction of a polymer diol (or macro glycol having a molecular weight lying in the range 1000 to 3500) and possibly also a diol (or chain-lengthener of low molecular weight, generally less than 300) with a diisocyanate. Synthesis can take place in two stages. The flexible and hard segments of the elastomer are delivered respectively by the polymer diol which represents the block of the thermoplastic elastomer polymer, and by the chain-lengthener. The hard segments unite by hydrogen bonding and the diisocyanate groups of adjacent chains unite with one another to form a crystal lattice in a flexible chain; this provides the equivalent of a partially-crystallized thermoplastic.

Amongst TPUs, a distinction can be drawn between those whose polymer diols are of the polyester(glycol) type such as polyethyleneadipate, poly-1,4-butyleneadipate, poly(E-caprolactam)glycol, etc. and those in which the polymer diols are of the polyether(glycol) type such as polypropyleneglycol, polyoxytetramethyleneglycol, polyoxypropylenepolyoxyethyleneglycol, etc. The polymer diol can also be of combined type, e.g. polyetherester. Diphenylene methanediisocyanate (MDI) is a diisocynate in common use, and 1,4-butanediol is a commonly used chain-lengthener.

Examples of commercial products are as follows Elastollan®1185 (PU-ether), Elastollan®190 (PU-ether), Elastollan®C85 (PU-ester), Elastollan®C90 (PU-ester), and Desmopan®588 (PU-etherester), Desmopan®385 (PU-etherester), polymers of the Elastollan® range being available from BASF and those in the Desmopan® range from Bayer.

Thermoplastic elastomers can be modified by adding fillers such as carbon black, silica, kaolin, alumina, clay, talc, chalk, etc. These fillers can be surface treated by means of silanes, polyethyleneglycols, or any other coupling molecule.

In addition, the compositions can be softened by fillers of plasticizer type such as mineral oils derived from petroleum, esters of phthalic acid, or sebacic acid, liquid polymer plasticizers such as polybutadiene of low molecular weight, possibly carboxylated, and other plasticizers that are well known to the person skilled in the art.

The compositions can be made more resistant to fire by adding fire retarding agents.

The content of such fillers, plasticizers, etc. in the thermoplastic elastomer is conventional and can vary over wide ranges.

Thus, in a variant, the protective skin of the invention is constituted by a filled thermoplastic elastomer, the fillers being present in a quantity that preferably goes up to 100 parts per 100 parts thermoplastic elastomer.

It is also possible for the thermoplastic elastomer to have added thereto fillers and additives that serve to improve the properties of the resulting skin. In particular, it is possible to use conventional mineral fillers to modify the mechanical deformation properties or indeed the temperature-resisting properties.

The thermoplastic elastomer with flexible diol segments of the invention tears quite easily, thereby giving easy access to the fiber. At the same time, the material is capable of withstanding temperatures of at least 130° C. and thus prevents the protective skin from softening during application of the cable sheath. In an embodiment, the protective skin can be extruded with a thin skin, skin thickness possibly being as little as 0.05 mm. In another embodiment, the protective skin can be extruded at high speed. It is also possible to apply the protective skin by chemical or physical foaming.

More generally, the invention proposes using a material possessing one or more of the following characteristics:

melting point higher than 130° C., preferably higher than 140° C.; and initial tearing strength (measured using the ASTM D1004 standard) less than 120 kN/m preferably less than 60 kN/m, and more preferably less than 40 kN/m.

The material proposed preferably presents breaking elongation (as measured using the ASTM 1238 standard) lying in the range 50% to 300% and tensile strength (measured using the ASTM 638 standard) lying in the range 5 MPa to 15 MPa.

The material is preferably flexible, having hardness (measured using the ASTM D2240 standard) on the Shore D scale of less than 50, with hardness of less than 40 being preferred.

The protective skin of thermoplastic elastomer having flexible diol segments preferably presents a hot fluidity index (measured using the ASTM 1238 standard) greater than or equal to 2 g/10 min. Such a material can be applied to the optical fibers 2 at high speed without defects appearing such as surface defects in the protective skin. It is possible to achieve speeds greater than 200 meters per minute (m/min), or indeed greater than 300 m/min or 400 m/min.

An example of the material of the invention is sold by Dupont de Nemours under the name Hytrel® grade G3548L. It has the following characteristics:

melting point 156° C.;

initial resistance to tearing 60 kN/m;

breaking elongation 215%;

ultimate tensile strength 8.6 MPa;

hardness on the Shore D scale 35; and hot fluidity index 10 g/10 min.

In another example, a thermoplastic elastomer having flexible diol segments referenced HTR 8 351 NC-010 from Dupont de Nemours is used. This substance presents the following characteristics:

melting point 140° C.;

initial resistance to tearing less than 20 kN/m;

breaking elongation 160%;

ultimate tensile strength 10 MPa;

hardness on the Shore D scale 23; and hot fluidity index 2 g/10 min.

Naturally, the present invention is not limited to the examples and embodiments described and shown, and numerous variants can be made thereto by the person skilled in the art.

What is claimed is:

1. A telecommunications cable module comprising a plurality of optical fibers surrounded by a protective skin of thermoplastic elastomer having flexible diol segments, with a melting point greater than 130° C. and initial resistance to tearing of less than 120 kN/m.

2. The module of claim 1, wherein the thermoplastic elastomer is a thermoplastic ether-ester elastomer.

3. The module of claim 1, wherein the thermoplastic elastomer is a polybutylene terephthalate glycol block copolymer.

4. The module of claim 1, wherein the thermoplastic elastomer includes a filler.

5. The module of claim 4, wherein the filler is selected from carbon black, silica, kaolin, alumina, clay, talc, chalk, magnesia, and titanium dioxide.

6. The module according of claim 1, wherein the thermoplastic elastomer includes a fire-retarding agent.

7. The module according of claim 1, wherein the thermoplastic elastomer possesses hardness on the Shore D scale of less than 50.

8. The module of claim 1, wherein the melting point of the skin material is at least 140° C.

9. The module of claim 1, wherein the initial resistance to tearing of the skin material is less than 60 kN/m.

10. The module of claim 1, wherein the breaking elongation of the skin material lies in the range 50% to 300%.

11. The module of claim 1, wherein the ultimate tensile strength of the skin material lies in the range 5 MPa to 15 MPa.

12. The module of claim 1, wherein the hot fluidity index to the skin material is greater than or equal to 2 g 10 min.

13. A method of manufacturing a telecommunications cable module according to claim 1, the method comprising the step of applying a protective skin of thermoplastic elastomer having flexible diol segments onto at least some of said plurality of optical fibers.

14. A method according to claim 13, wherein the protective skin is applied by extrusion.

15. A telecommunications cable comprising at least one module according to claim 1.

16. The module of claim 1, wherein the thermoplastic elastomer is selected from the group comprising polyetherester, polyurethaneether, polyurethaneester, polyurethaneetherester; and polyetheramides.

17. The module of claim 1, wherein said protective skin has a thickness of (0.05 to 0.25 mm.

18. The module of claim 1, wherein the initial resistance to tearing is less than 40 kN/m.

19. The module of claim 4, wherein for every 100 parts of said filler there are 100 parts of said thermoplastic elastomer.

20. The module of claim 1, wherein said thermoplastic elastomer possesses hardness on the Shore D scale of less than 40.

* * * * *